(12) United States Patent
Berger (10) Patent No.: US 6,385,233 B1
(45) Date of Patent: May 7, 2002

(54) UNBALANCED QUADRATURE WAVEFORM

(75) Inventor: Harvey L. Berger, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/268,944

(22) Filed: Mar. 16, 1999

(51) Int. Cl.⁷ .............................................. H04L 27/00
(52) U.S. Cl. ...................... 375/216; 375/269; 375/273; 375/298; 375/308; 332/103; 332/144; 455/69; 455/108; 455/110
(58) Field of Search ................................ 375/216, 271, 375/273, 261, 269, 264, 268, 295, 298, 300, 308; 332/103, 144; 455/102, 108, 110, 127, 69

(56) References Cited

U.S. PATENT DOCUMENTS

| | | | | |
|---|---|---|---|---|
| 4,736,170 A | * | 4/1988 | Wu et al. ........................ | 332/21 |
| 5,093,840 A | * | 3/1992 | Schilling ......................... | 375/1 |
| 5,241,565 A | * | 8/1993 | Kloc et al. ...................... | 375/58 |
| 5,594,454 A | * | 1/1997 | Devereux et al. ............ | 342/357 |
| 5,675,611 A | * | 10/1997 | Lehtinen et al. ............. | 375/297 |
| 5,963,870 A | * | 10/1999 | Chheda et al. ............... | 455/522 |
| 6,035,209 A | * | 3/2000 | Tiedemann, Jr. et al. ... | 455/522 |

* cited by examiner

Primary Examiner—Stephen Chin
Assistant Examiner—Dac V. Ha
(74) Attorney, Agent, or Firm—McAndrews, Held & Malloy, Ltd.

(57) ABSTRACT

A method 1100 and apparatus 1200 utilizing unbalanced modulation for providing users in a communication system with different amounts of effective communication energy according to their individual communication environments. A user's communication energy needs are determined based on conditions such as weather, signal-to-noise ratio, and cell location. Signals destined for a user are modulated according to the determined needs of the user. A signal destined for a user operating in a relatively friendly communication environment is modulated with less effective energy than a signal destined for a user operating in a relatively hostile communication environment.

20 Claims, 7 Drawing Sheets

UNBALANCED QUADRATURE WAVEFORM

BACKGROUND OF THE INVENTION

The present invention generally relates to signal modulation strategies. More specifically, the present invention relates to utilizing unbalanced modulation to provide signals with different modulation energies to different users of a communication system.

Phase modulation ("PM") is widely used in communication systems. In phase modulation schemes, data is encoded in either the absolute phase of the waveform or by changes in the phase of the waveform. One reason for the popularity of PM is the robustness of PM with respect to additive white Gaussian noise. Common examples of PM include Binary Phase Shift Keying ("BPSK"), Quadrature Phase Shift Keying ("QPSK"), and Gaussian Minimum Shift Keying ("GMSK").

QPSK, for example, represents two bits of information (which may assume a total of four different values) in every symbol. A symbol consists of a phase shift by one of four possible phase shift values. The phase shift values are typically chosen to be plus/minus 45 degrees and plus/minus 135 degrees. QPSK systems in which the phase shift values are such that there are 90 degrees between each resultant phase are referred to as balanced QPSK systems. A balanced QPSK approach is usually chosen because it minimizes the likelihood of confusion between any two of the four possible symbols.

As the demand for communication bandwidth rises, the concern over efficient use of available bandwidth similarly rises. Bandwidth efficiency concerns are sometimes addressed through relatively efficient modulation techniques, such as GMSK. Another technique for increasing the efficiency of bandwidth usage is cellular communication. In cellular communication, the physical area in which communication is to occur is divided up into many physical regions referred to as cells. A sub-band of the total system frequency bandwidth is allocated to each cell. In order to reduce cross-cell interference, sub-bands are generally allocated to the cells such that no adjacent cells utilize the same sub-band. However, the same sub-band may be allocated to many non-adjacent cells. Because the cells that share the same sub-band are not adjacent to each other, cross-cell interference is reduced.

One problem with past cellular systems, both satellite-based and terrestrial, results from the non-uniformity of antenna gain patterns. Signals destined for users located within a cell are generally modulated consistently from user to user. In addition, users located within a cell are generally serviced by the same downlink transmitter, which generates a set amount of signal power for all users in the cell. The signal generated by the transmitter is then sent through an antenna, which distributes the signal energy throughout the cell according to the antenna gain pattern. The highest antenna gain is typically at the cell center, and the lowest antenna gain is typically at the cell boundary. Thus, users near the cell center receive much stronger signals than users near the cell boundary. However, since users near the cell boundary are relatively close to neighboring cells, cross-cell interference is stronger near the cell boundary than near the cell center. Therefore, a stronger signal is actually desired near the cell boundary than near the cell center. However, past systems provide just the opposite.

Since the majority of cross-cell interference problems in a cell occur near the cell boundary, the cell boundary is where the poorest quality communication occurs. In order to compensate, the downlink transmission power level for an entire cell is typically set so that some minimum communication quality level is obtained near the cell boundary. This results in a large disparity in communication quality between the cell boundary and the cell center. While communication quality at the cell boundary meets some minimum requirement, the communication quality at the cell center greatly exceeds the minimum requirement. Thus, there is often a significant amount of energy wasted in communication with users near the cell center. In communication systems with limited power resources, particularly satellite communication systems, the resultant wasted energy is extremely detrimental.

A need exists for a method and apparatus to provide different effective signal energy levels to users within a cell or other area of coverage, depending on their respective needs.

SUMMARY OF THE INVENTION

It is an object of the present invention to provide different users of a communication system with different amounts of effective communication energy.

It is another object of the present invention to provide different users of a communication system with different amounts of effective communication energy using unbalanced modulation.

It is another object of the present invention to provide different users of a communication system with different amounts of effective communication energy using unbalanced quadrature phase shift keyed modulation.

It is yet another object of the present invention to provide users near the boundary of a cell in a cellular communication system with a different amount of communication energy than users near the center of the cell.

One or more of the foregoing objects is met in whole or in part by a preferred embodiment of the present invention, which provides a method and apparatus for providing users in a cell of a cellular communication system with different amounts of effective communication energy depending on their respective communication requirements. The method of the preferred embodiment determines the signal energy requirements for a particular user. A modulation strategy is then chosen which comprises high energy modulation components and/or low energy modulation components depending on the requirements of the user. The present invention provides an unbalanced quadrature phase shift keyed modulation strategy, in which the in-phase and quadrature components have unbalanced amplitudes. Once a particular modulation strategy is chosen for a communication, the transmitting entity and receiving entity are synchronized so that each knows which modulation strategy was chosen. The data to be communicated is then modulated and transmitted from the source to the destination, at which point the signal is demodulated and data decisions are made.

The apparatus of the preferred embodiment provides a data source, which supplies information to be sent from a source to a destination. A modulation controller is provided to determine the amount of effective communication energy required by the communicating entities and to decide upon the appropriate modulation strategy to supply that energy. An unbalanced modulator is provided which modulates the information according to the modulation strategy chosen by the modulation controller. The preferred unbalanced modulator is an unbalanced quadrature phase shift keying modulator. In one embodiment of the present invention, a timeslot controller is provided to balance TDMA timeslots and effective bit rate thereby ensuring that communication takes place in a timely manner.

DETAILED DESCRIPTION OF THE PREFERRED EMBODIMENT

Figure 1:
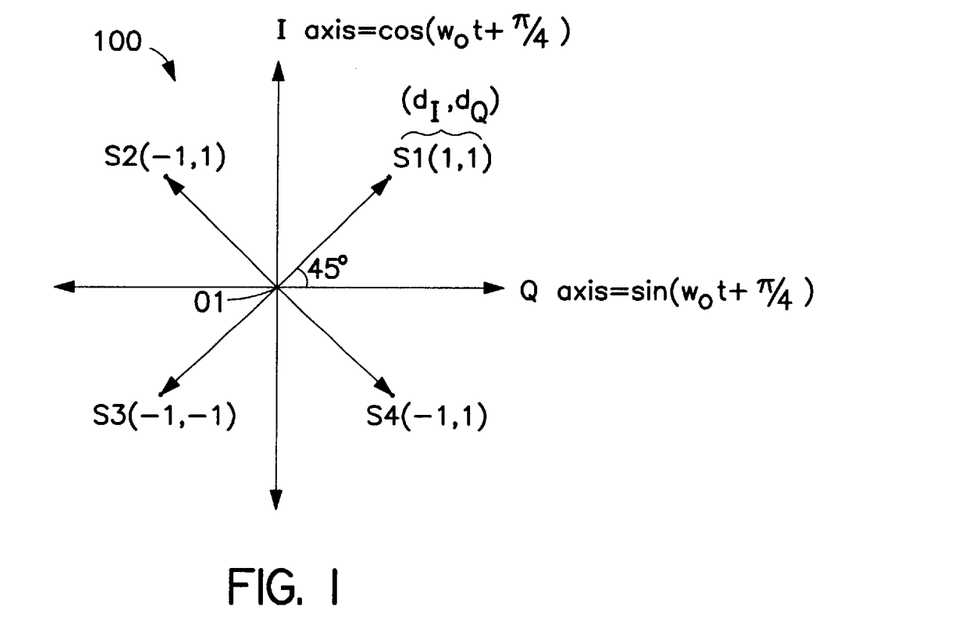
FIG. 1 illustrates a balanced QPSK signal space and ideal constellation.

FIG. 1 illustrates a signal space and constellation 100 for balanced QPSK modulation. In QPSK, the phase of the modulated waveform carries information while the frequency and amplitude remain constant. In QPSK, a symbol, in the form of a phase angle, takes one of four possible values. Those four values may be used to represent two bits of digital information. In the example illustrated in FIG. 1, the $(d_I, d_Q)$ bit combination of (1, 1), also known as symbol S1, results in a phase of 45 degrees measured counterclockwise about the origin O1 from the positive Q axis. Likewise, the bit combination of (-1, 1), also known as symbol S2, results in a phase of 135 degrees, the bit combination of (-1, -1), also known as symbol S3, results in a phase of 225 degrees, and the bit combination of (1, -1), also known as symbol S4, results in a phase of 315 degrees. The QPSK example illustrated in FIG. 1 is commonly referred to as balanced QPSK, because there is a 90 degree phase difference between angularly adjacent symbols.

Figure 2:
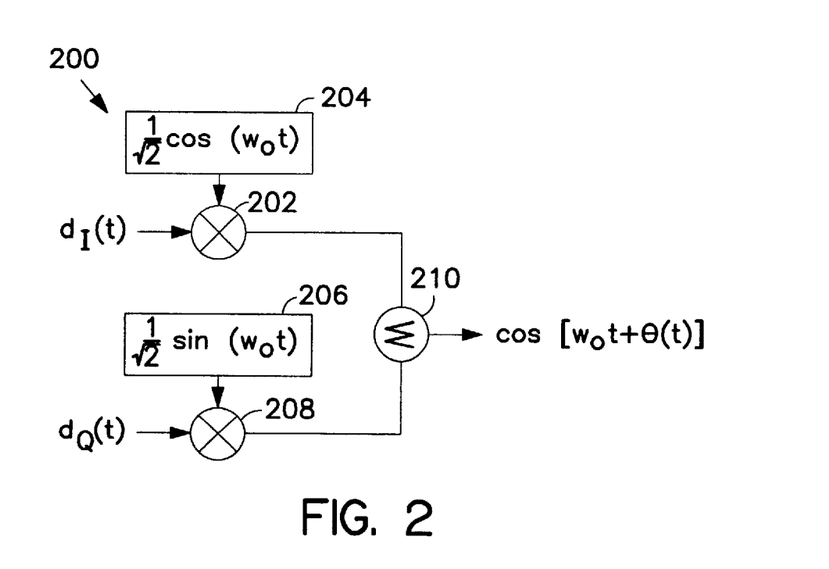
FIG. 2 illustrates a balanced QPSK modulator.

FIG. 2 illustrates a balanced QPSK modulator 200 designed to produce the modulation represented by the signal space diagram 100 of FIG. 1. A bit pattern $(d_I, d_Q)$ is input to the modulator 200. Bits $d_I$ and $d_Q$ assume values of either 1 or -1. Bit $d_I$ and a cosine waveform 204 are input to a multiplier 202. When bit $d_I$ is a 1, the output of the multiplier 202 is the cosine waveform 204. When bit $d_I$ is a -1, the output of the multiplier 202 is an inverted version of the cosine waveform 204. Bit $d_Q$ and a sine waveform 206 are input to a multiplier 208. When bit $d_Q$ is a 1, the output of the multiplier 208 is the sine waveform 206. When bit $d_Q$ is a -1, the output of the multiplier 208 is an inverted version of the sine waveform 206. A summer 210 adds the outputs of the two multipliers (202 and 208). The waveform output from the summer 210 is a cosine wave of unit amplitude, with a frequency equal to that of the cosine waveform 204 and the sine waveform 206, and at one of the four previously-mentioned phase angles. Note that the cosine waveform 204 and the sine waveform 206 are 90 degrees apart in phase. This is one defining characteristic of QPSK. Also note that the amplitudes of the cosine waveform 204 and the sine waveform 206 are equal. The amplitude and phase characteristics noted above result in a balanced QPSK output signal.

Figure 3:
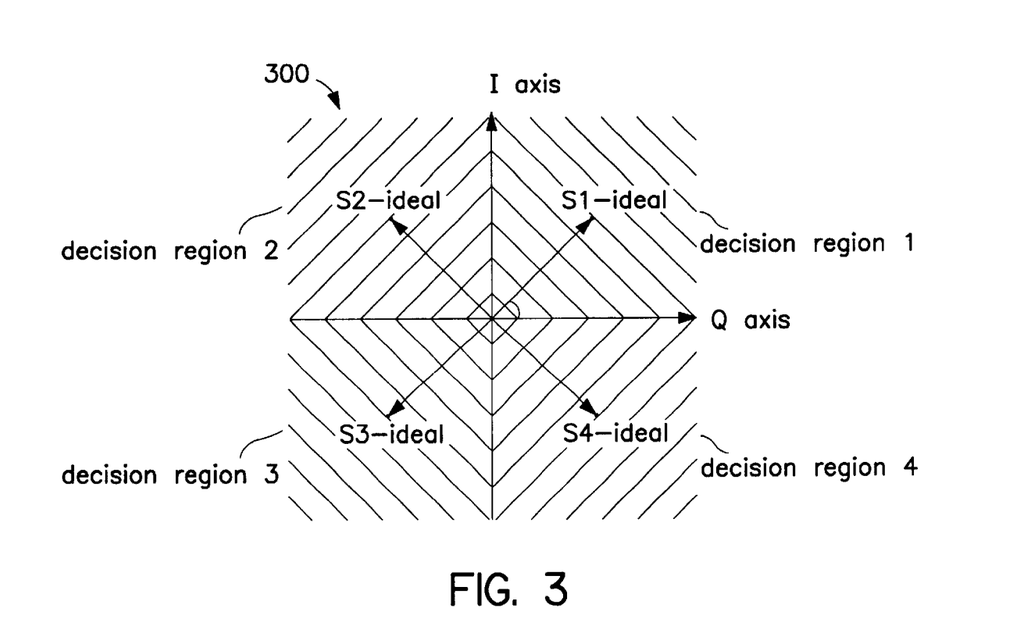
FIG. 3 illustrates a balanced QPSK signal space, ideal constellation, and decision regions.

When a QPSK-modulated waveform arrives at the destination receiver, it must be demodulated, and the data that was used to modulate the originally transmitted waveform must be detected. To do this, the demodulator must make what are commonly referred to as data decisions. FIG. 3 illustrates a typical signal space 300 and decision regions (decision region 1, decision region 2, decision region 3 and decision region 4) for a typical QPSK system. The system can tolerate up to, but not including, a 45 degree phase error for a given symbol. For example, the symbol S1-ideal is shown as ideally having a 45 degree phase, as measured counterclockwise from the positive Q axis. If an incoming balanced QPSK signal representing S1 lies in decision region 1 (the signal has a phase between 0 and 90 degrees), the correct symbol decision of S1 will be made. Likewise, symbols S2, S3, and S4 also have a +/-45 degree margin of error. However, if an incoming balanced QPSK signal representing S1 has a phase of 91 degrees, it will lie in decision region 2, and the incorrect symbol decision of S2 will be made. Note that for the signal space 300 and decision regions (decision region 1, decision region 2, decision region 3 and decision region 4) illustrated in FIG. 3 for balanced QPSK, the minimum margin of error between any two symbols is 45 degrees.

Figure 4:
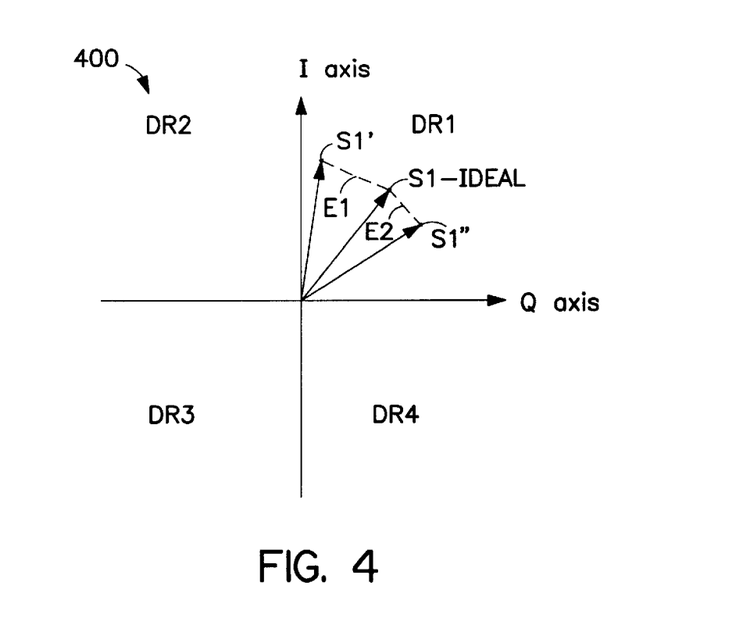
FIG. 4 illustrates an exemplary balanced QPSK noise situation for an advantaged user.

As mentioned earlier, interference levels experienced by different users vary. As an example, compare the signal space and decision regions illustrated in FIGS. 4 and 5. FIG. 4 illustrates an exemplary signal space 400 and decision regions (DR1, DR2, DR3 and DR4) for a user near the center of a communication cell. Also illustrated are the ideal position of symbol S1, S1-ideal, and hypothetical received S1 symbols, S1' and S1". Even the relatively high interference energy E1 affecting the received symbol S1' was of insufficient magnitude to pull the received symbol S1' into an incorrect decision region DR2. Thus, the symbol decisions made for both received symbols, S1' and S1", will both be correct.

Figure 5:
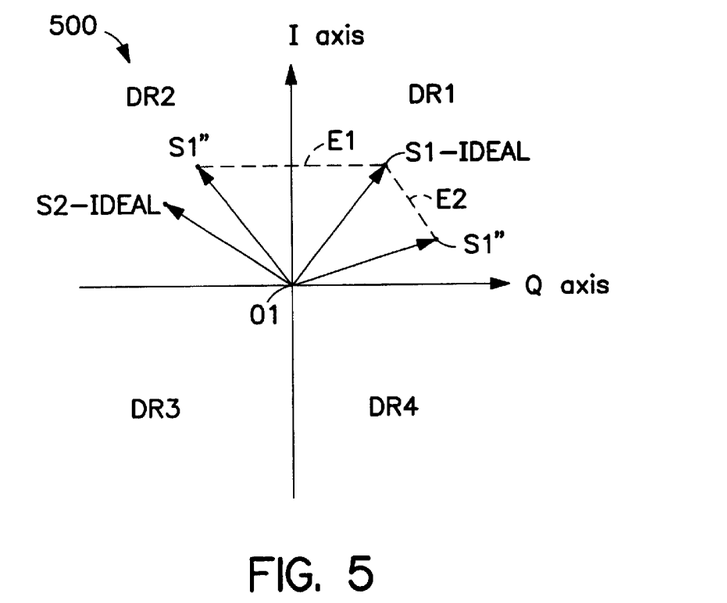
FIG. 5 illustrates an exemplary balanced QPSK noise situation for a disadvantaged user.

Consider now FIG. 5, however, which illustrates a signal space 500 and decision regions (DR1, DR2, DR3 and DR4) for a user near the boundary of a communication cell. The hypothetical received S1 symbols (S1' and S1"), and also the ideal expected S1 symbol S1-ideal, are closer in magnitude to the origin O1 of the signal space 500. This is caused by the lower antenna gain near the cell boundary, which was discussed earlier. Generally, the closer the received symbols are to the origin O1 of the signal space 500, the less interference energy is required to move the received symbols into an incorrect decision region.

For the example illustrated in FIG. 5, the same interference energies, E1 and E2, were chosen as were chosen for the example illustrated in FIG. 4 (E1 and E2). In reality, a cell boundary user would most likely encounter higher interference energies than a cell center user due to closer proximity to neighboring cells. Notice that one of the received S1 symbols S1" has been pulled into an incorrect decision region DR2. The received S1 symbol S1" which was pulled into the incorrect decision region DR2 will result in a symbol decision error of S2. Thus, the data extracted from the signal will not match the data that was originally transmitted.

Figure 6:
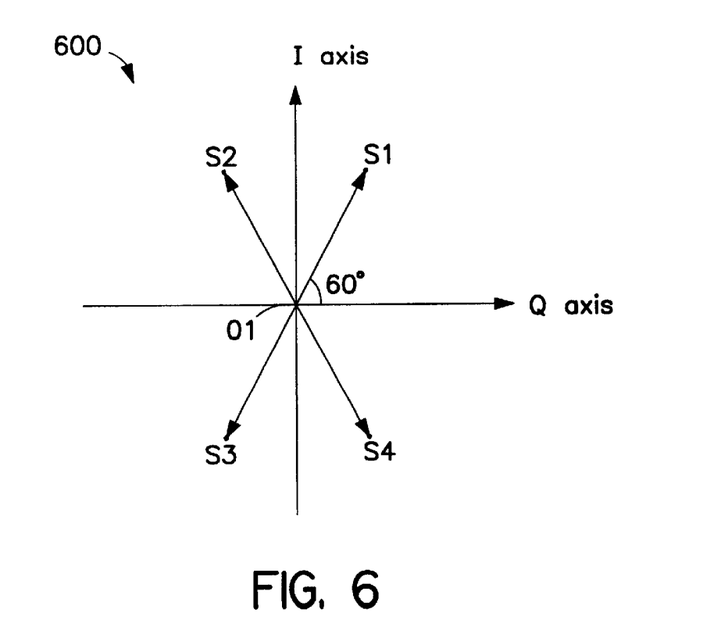
FIG. 6 illustrates an unbalanced quadrature phase shift keying (hereinafter "UQPSK") signal space and ideal constellation.

Refer next to FIG. 6, which illustrates a signal space 600 for unbalanced QPSK (hereinafter "UQPSK"). Note that the angularly adjacent symbols are no longer the balanced 90 degrees apart. The distance from the origin O1 to the symbols (S1, S2, S3 and S4) of FIG. 6 is the same as the distance from the origin O1 to the symbols of FIG. 1. Thus, the total transmitted energy is the same between the two examples. However, the signal energy is no longer balanced between the I and Q modulation axes.

Figure 7:
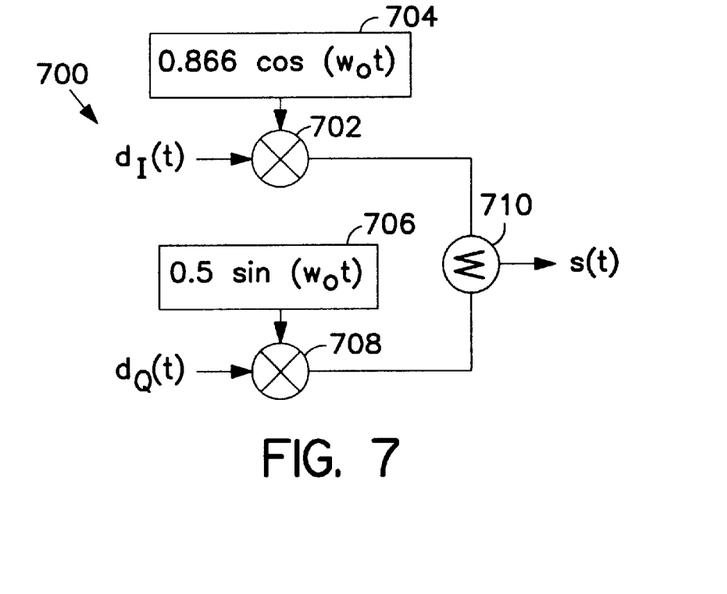
FIG. 7 illustrates a UQPSK modulator.

FIG. 7 illustrates an unbalanced QPSK modulator 700 designed to produce the modulation represented by the signal space diagram 600 of FIG. 6. A bit pattern ($d_I$, $d_Q$) is input to the modulator 700. Bits $d_I$ and $d_Q$ assume values of either 1 or −1. Bit dj and a cosine waveform 704 are input to a multiplier 702. When bit $d_I$ is a 1, the output of the multiplier 702 is the cosine waveform 704. When bit $d_I$ is a −1, the output of the multiplier 702 is an inverted version of the cosine waveform 704. Bit $d_Q$ and a sine waveform 706 are input to a multiplier 708. When bit $d_Q$ is a 1, the output of the multiplier 708 is the sine waveform 706. When bit $d_Q$ is a −1, the output of the multiplier 708 is an inverted version of the sine waveform 706. A summer 710 adds the outputs of the two multipliers (702 and 708). The waveform output from the summer 710 is a cosine wave of unit amplitude and with a frequency equal to that of the cosine waveform 704 and the sine waveform 706. Note that the cosine waveform 704 and the sine waveform 706 are 90 degrees apart in phase, which is one defining characteristic of QPSK. However, the amplitudes of the cosine waveform 704 (0.866) and the sine waveform 706 (0.5) are not equal, as in the balanced QPSK case illustrated in FIG. 2. The amplitude and phase characteristics noted above result in an unbalanced QPSK output signal. The unbalanced amplitudes of the cosine waveform 704 (0.866) and the sine waveform 706 (0.5) according to the preferred embodiment result in phase values of 60°, 120°, 240° and 300° as measured counter-clockwise from the positive Q axis.

The amplitudes of the cosine waveform 704 and the sine waveform 706 are a function of the amount of imbalance desired, and may be readily modified to achieve more or less phase imbalance than the example discussed above. For example, for a four-to-one power imbalance, meaning the symbol energies are four times as far away from the minor axis of modulation as the major axis, amplitudes of approximately 0.447 and 0.894 may be chosen.

Figure 8:
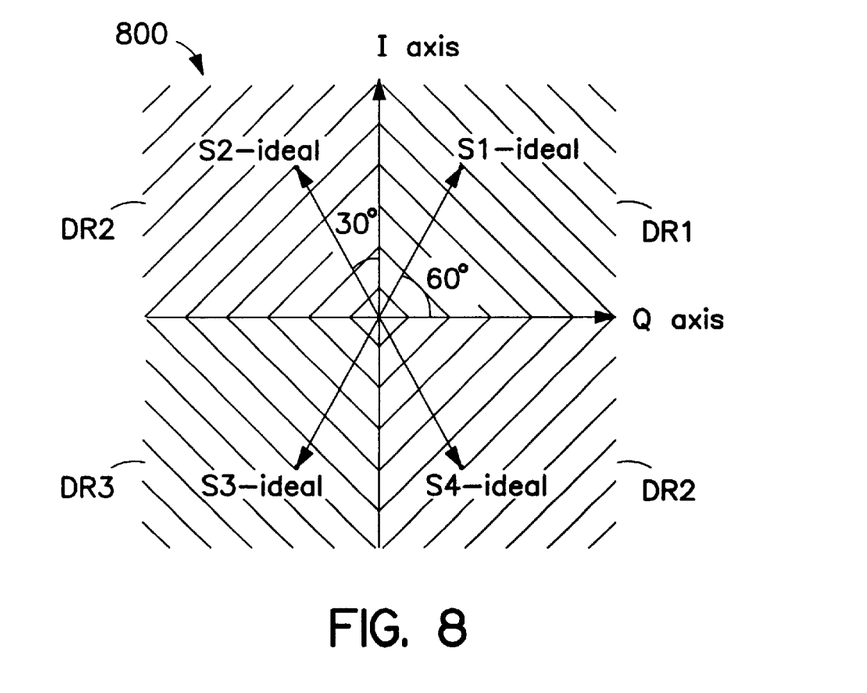
FIG. 8 illustrates a UQPSK signal space, ideal constellation, and decision regions for a user utilizing both modulation axes for data decision making.

FIG. 8 illustrates an exemplary signal space 800 and decision regions (DR1, DR2, DR3 and DR4) for a UQPSK system in which a user is utilizing both axes of modulation (I-axis and Q-axis), and thus, all four symbols (S1, S2, S3 and S4). In deciding between symbols Si and S2 and between symbols S3 and S4, the maximum phase error the system can tolerate is up to, but not including 30 degrees. In deciding between symbols S1 and S4 and between symbols S2 and S3, the maximum phase error the system can tolerate is up to, but not including, 60 degrees. Robustness of the I axis modulation separating S1 and S4 and separating S2 and S3 is increased at the expense of the robustness of the Q axis modulation separating S1 and S2 and separating S3 and S4.

For example, the symbol S1 is shown as ideally having a 60 degree phase, measured counterclockwise from the positive Q axis. If an incoming UQPSK signal representing S1 lies in decision region 1 (that is the signal has a phase between 0 and 90 degrees), the correct symbol decision of S1 will be made. Likewise, symbols S2, S3, and S4 also have a +/−30 degree margin of error from the I axis and a −/+60 degree margin of error from the Q axis. If an incoming UQPSK signal representing S1 has a phase of 91 degrees, it will lie in an incorrect decision region DR2, and the incorrect symbol decision of S2 will be made. Note that for the signal space 800 and decision regions (DR1, DR2, DR3 and DR4) illustrated in FIG. 8 for UQPSK, the minimum margin of error between any two symbols is 30 degrees, which is lower than the minimum margin of error of 45 degrees between any two symbols for the balanced QPSK system discussed earlier.

Figure 9A:
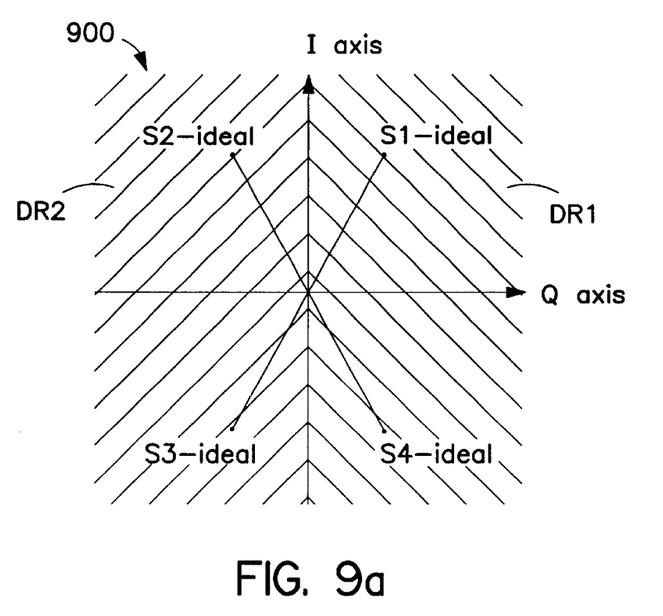
FIG. 9a illustrates a UQPSK signal space, ideal constellation, and decision regions for a user utilizing the minor axis of modulation for data decision making.
Figure 9B:
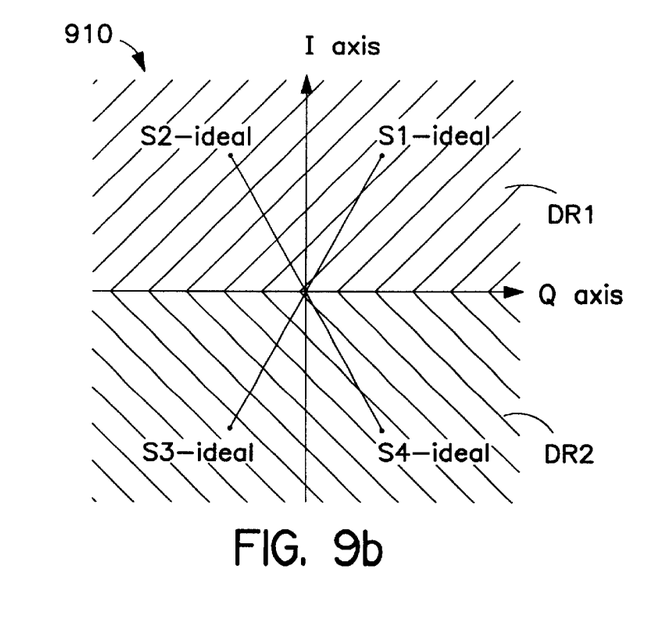
FIG. 9b illustrates a UQPSK signal space, ideal constellation, and decision regions for a user utilizing

FIGS. 9a and 9b illustrate UQPSK signal space and decision regions, DR1 and DR2, for users utilizing only one of the two axes of modulation (Q-axis and I-axis respectively). FIG. 9a illustrates a UQPSK signal space 900 and decision regions, DR1 and DR2, for a user utilizing only the Q axis of modulation for symbol decision making. In this case, the Q axis may also be referred to as the "minor axis of modulation", since the difference between any two symbols along the Q axis is ideally less than the difference between any two symbols along the I axis. Minor axes of modulation are generally used to represent relatively low energy components of an unbalanced modulation.

Note that two symbols, S1 and S4, are both in decision region DR1, and two symbols, S2 and S3, are both in decision region DR2. Thus a user utilizing only the Q axis of modulation for symbol decision-making does not distinguish between the symbols S1 and S4 and between the symbols S2 and S3. FIG. 9b illustrates a UQPSK signal space 910 and decision regions, DR1 and DR2, for a user utilizing only the I axis of modulation for symbol decision making. In this case, the I axis may also be referred to as the "major axis of modulation", since the difference between any two symbols along the I axis is ideally greater than the difference between any two symbols along the Q axis. Major axes of modulation are generally used to represent relatively high energy components of unbalanced modulation. Note that two symbols, S1 and S2, are both in decision region DR1, and two symbols, S3 and S4, are both in decision region DR2. Thus a user utilizing only the I axis of modulation for symbol decision-making does not distinguish between the symbols S1 and S2 and between the symbols S3 and S4.

To illustrate the utilization of major and minor axes of unbalanced modulation by two different users, consider user A and user D. User A is an advantaged user in a relatively friendly communication environment. User D is a disadvantaged user in a relatively hostile communication environment (e.g., near a cell boundary). Since user D requires more effective communication energy than user A for reliable communication, the communication system modulates the signal according to data destined for user D along a major axis of modulation. Since user A requires less effective communication energy than user D, the communication system modulates the signal according to data destined for user A along a minor axis of modulation. Since user A is advantaged and user D is disadvantaged, user A will likely receive a much stronger signal than user D. However, the effective amount of communication energy in the signal is proportionally greater for user D than for user A. For example, if user A receives a signal that is four times stronger than the signal received by user D, and the effective communication energy in the signal is four times greater for user D than for user A, then both users receive the same amount of effective communication energy.

Figure 10A:
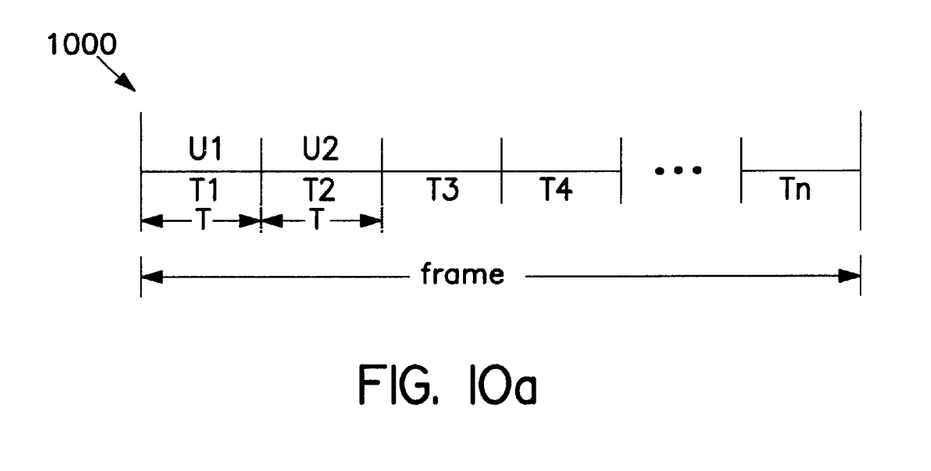
FIG. 10a illustrates a traditional TDMA timeslot allocation for a system utilizing balanced QPSK.
Figure 10B:
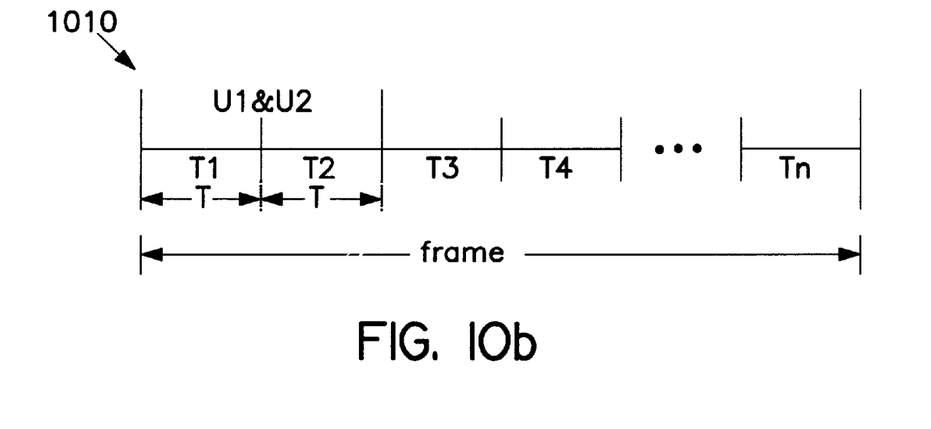
FIG. 10b illustrates an exemplary TDMA timeslot allocation for a system utilizing UQPSK.

When a user is utilizing only one axis of modulation for data decision-making, the user effectively only has access to half of the transmitted information. However, since another user will utilize the other axis of modulation simultaneously, the overall rate of data transmission is unaffected. FIGS. 10a and 10b illustrate that the overall rate of data transmission remains unchanged. FIGS. 10a and 10b illustrate examples of a network communicating with two users using time division multiple access ("TDMA").

In TDMA, a frequency band is divided into frames and timeslots, and users are assigned individual repeating timeslots. FIG. 10a illustrates a typical allocation of TDMA timeslots 1000 for a balanced QPSK system. There are two users, U1 and U2, in the scenario of FIG. 10a. One user U1 is an "advantaged user", which means the user U1 is receiving a relatively strong and clear signal. The other user U2 is referred to as a "disadvantaged user", which means the user U2 is receiving a relatively weak and noisy signal. The advantaged user U1 is assigned a timeslot T1 of length T, and the disadvantaged user U2 is assigned a timeslot T2 of length T. Since the scenario illustrated in FIG. 10a is utilizing a balanced QPSK system, the advantaged user is receiving a stronger and clearer signal than is necessary, while the disadvantaged user is receiving a signal with the minimum desired strength and clarity. For example, if the exemplary system illustrated in FIG. 10a communicates 100 symbols per timeslot, each user, U1 and U2, receives 200 bits of information in their respective timeslot, and thus each user receives 200 bits of information per frame. Note that the total combined time allocated to both users, U1 and U2, is 2T.

Refer now to the exemplary system illustrated in FIG. 10b, which is utilizing TDMA and UQPSK. For the sake of comparison with the previous example, the advantaged user U1 and the disadvantaged user U2 are sharing two timeslots, T1 and T2. The advantaged user U1 is utilizing the phase shift information along the minor axis of UQPSK modulation, as was illustrated in FIG. 9a. The disadvantaged user U2 is utilizing the phase shift information along the major axis of UQPSK modulation, as was illustrated in FIG. 9b. Since both users, U1 and U2, are only effectively utilizing half of the UQPSK information, the effective data rate arriving at each user, U1 and U2, is half the rate of the example illustrated in FIG. 10a. For example, if the exemplary system illustrated in FIG. 10b communicates 100 symbols per timeslot, each user, U1 and U2, receives 100 bits of information per timeslot. However, since each user is acquiring information over two timeslots (T1 and T2), each user still receives 200 bits of information per frame. Note that the total combined time allocated to both users (U1 and U2) is 2T, which is the same as in the example illustrated in FIG. 10a. Thus, the total data received by each user, U1 and U2, may be the same using QPSK or UQPSK, and the total combined time usage for both users, U1 and U2, may also be the same.

The primary difference between the examples of FIGS. 10a and 10b is that in FIG. 10b, the disadvantaged user is effectively allocated more communication energy than the advantaged user. Excess communication energy, wastefully allocated to advantaged users in traditional QPSK systems, is effectively reallocated to disadvantaged users. Note that the allocation of multiple TDMA timeslots to a single user, as illustrated in FIG. 10b, is not necessary but may be used to maintain a desired data rate.

Figure 11:
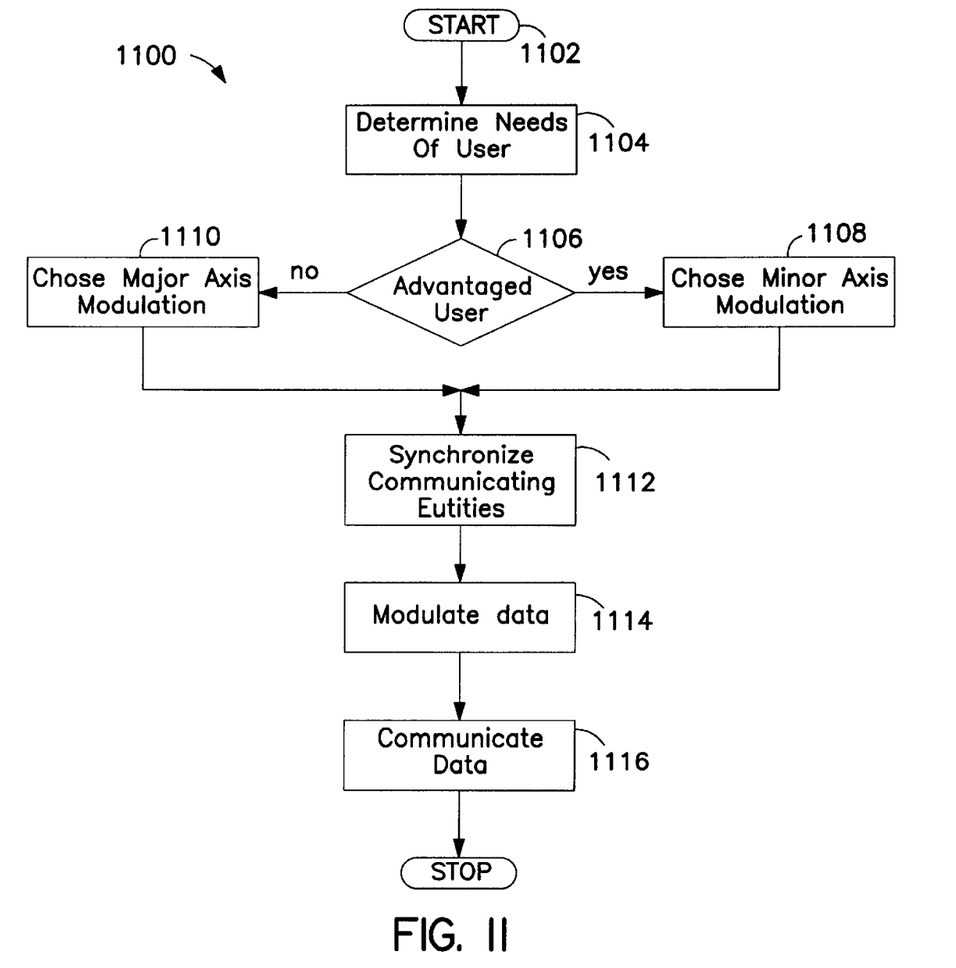
FIG. 11 illustrates a method for utilizing unbalanced modulation to effectively allocate different levels of effective communication energy to different users.

FIG. 11 contains a flow chart 1100 illustrating a method for utilizing unbalanced modulation to effectively allocate different levels of signal energy to different users, depending on their respective needs. The method illustrated in FIG. 11 utilizes UQPSK modulation according to a preferred embodiment of the present invention. However, the invention is certainly not limited to the use of QPSK nor to phase-shift keying in general. The inventive concept may readily be applied to other modulation strategies, such as 8 PSK, 16 PSK, and 16 QAM.

The method begins at step 1102 when the decision is made to communicate data with a user. The communication environment (which may include signal-to-noise ratio, bit error rate, geographical location, etc.) for the user is analyzed at step 1104 and a decision is made at step 1106 as to whether a user is advantaged or disadvantaged. An advantaged user may, for example, be a user in a desirable communication environment with a high signal-to-noise ratio, low bit error rate, geographical location near the center of a communication cell, and the like, and thus requires a relatively low amount of effective communication energy to maintain an acceptable communication link.

A disadvantaged user is a user in an undesirable communication environment characterized by a low signal-to-noise ratio, high bit error rate, geographical location near the outer perimeter of a communication cell, a subscriber paying for enhanced service, and the like, and thus requires or expects a relatively high amount of effective communication energy to maintain an acceptable communication link. If the user is classified by the system to be an advantaged user, the decision is made to use a minor axis of modulation 1108 for the communication with the user. If the user is classified by the system to be a disadvantaged user, the decision is made to use a major axis of modulation at step 1110 for communication with the user.

Though not shown on the flow chart in FIG. 11, the system may also chose to allocate both axes of modulation to a particular user. After the method of modulation is decided upon for a particular user, the transmitting and receiving entity(s) are synchronized at step 1112 so that each entity is aware of the chosen modulation method. The modulation and synchronization may also include timing and timeslot synchronization, which may be used in a TDMA system. Once the transmitting and receiving entities involved in the communication are synchronized, the data is modulated 1114 according to the chosen method of modulation. Following modulation 1114, the data is communicated 1116 between transmitting and receiving entities.

Figure 12:
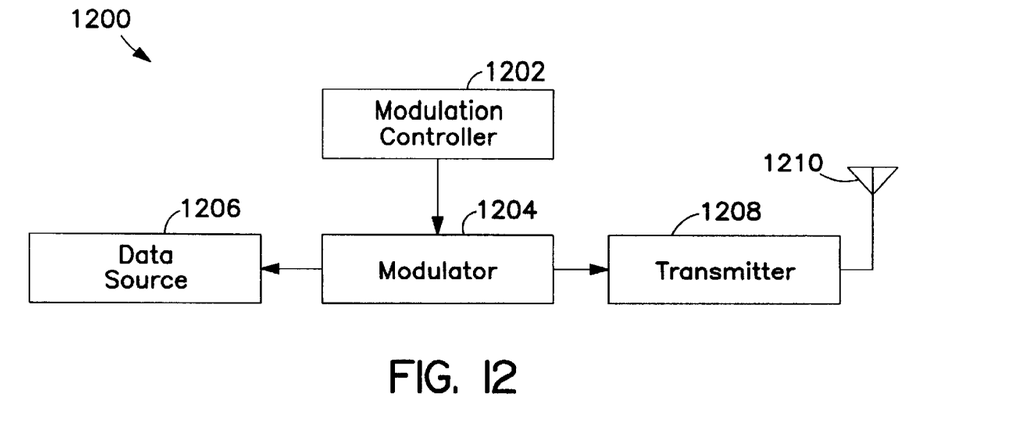
FIG. 12 illustrates a high level system for utilizing unbalanced modulation to effectively allocate different levels of effective communication energy to different users.

FIG. 12 presents a high-level communication system 1200 according to a preferred embodiment of the present invention. A modulation controller 1202 is provided which may actively communicate with the user or passively listen to the user in order to gather data necessary to chose between modulation options. Optionally, the modulation controller 1202 may use information pertaining to the physical location of a user within a particular antenna pattern to chose a modulation strategy. The modulation controller 1202 communicates the desired modulation strategy to the modulator 1204. The modulator 1204 incorporates data from the data source 1206 into a modulated signal. The modulator 1204 may be an UQPSK modulator. The modulated signal is provided to a transmitting entity 1208, which converts the modulated signal into RF energy and transmits the RF energy to the user through an antenna 1210. Though not illustrated in FIG. 12, the communication system 1200 may include a TDMA controller. In a TDMA communication system, a TDMA controller would allocate a single recurring timeslot to both an advantaged user and a disadvantaged user to efficiently utilize the available frequency bandwidth.

The method and apparatus of the present invention utilize unbalanced modulation to effectively communicate with different users using different amounts of communication energy. Limited energy resources are allocated efficiently between users requiring different amounts of communication energy. This results in extended life for communication systems with limited energy resources without sacrificing communication reliability. In addition, reductions in the transmission of unnecessary communication energy will result in a less noisy communication environment overall.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for providing different effective communication energy levels to different users of a communication system the method comprising:

determining communication energy requirements for the users;

modulating a signal for communication with said users using unbalanced modulation, said signal modulated with a relatively high energy component of said unbalanced modulation when a first of said users requires relatively high communication energy, and said signal modulated with a relatively low energy component of said unbalanced modulation when a second of said users requires relatively low communication energy; and transmitting said signal to said users during a common time period at substantially the same data rate for said signal modulated with a relatively high energy component and said signal modulated with a relatively low energy component.

2. The method of claim 1, wherein said different users are located within a single cell of the communication system.

3. The method of claim 1, wherein said step of modulating a signal further comprises amplitude and phase modulating said signal.

4. The method of claim 1, wherein said step of modulating a signal comprises phase modulating said signal along a major axis of phase modulation when the first of said users requires relatively high communication energy and phase modulating said signal along a minor axis of phase modulation when the second of said users requires relatively low communication energy.

5. The method of claim 1, wherein said step of modulating a signal comprises phase modulating said signal using unbalanced quadrature phase shift keyed modulation.

6. The method of claim 5, wherein said step of phase modulating said signal using unbalanced quadrature phase shift keyed modulation comprises phase modulating said signal along a major axis of phase modulation when the first of said users requires relatively high communication energy and phase modulating said signal along a minor axis of phase modulation when the second of said users requires relatively low communication energy.

7. A method for providing different effective communication energy levels to different users of a communication system, the method comprising:

classifying a first of the users as an advantaged user when said first user requires relatively low communication energy, and classifying a second of the users as a disadvantaged user when said second user requires relatively high communication energy;

modulating a signal for communication with said users using unbalanced phase modulation, wherein said signal is phase modulated along a major axis of phase modulation when said user is a disadvantaged user, and wherein said signal is phase modulated along a minor axis of phase modulation when said user is an advantaged user; and transmitting said signal to said users during a common time period at substantially the same data rate for the advantaged user and the disadvantaged user.

8. The method of claim 7, wherein said step of determining communication energy requirements for the users comprises:

determining geographical locations corresponding to the users; and determining said communication energy requirements for said users based on said geographical locations.

9. The method of claim 8, wherein said communication system is a cellular communication system, and wherein said step of determining communication energy requirements for the users further comprises classifying a first of the users as an advantaged user when said first user is relatively close to a cell center and classifying a second of the users as a disadvantaged user when said second user is relatively close to a cell boundary.

10. The method of claim 7, wherein said step of determining communication energy requirements for the users comprises:

measuring signal-to-noise ratios for said users; and determining said communication energy requirements for said users based on said signal-to-noise ratios.

11. The method of claim 7, wherein said step of determining communication energy requirements for the users comprises:

determining bit error rates for said users; and determining said communication energy requirements for said users based on said bit error rates.

12. The method of claim 7, wherein said step of modulating a signal further comprises modulating said signal using unbalanced quadrature phase shift keyed modulation.

13. The method of claim 12, wherein said communication system is a TDMA communication system, the method further comprising assigning a single TDMA timeslot to both an advantaged one of the users and a disadvantaged one of the users.

14. The method of claim 7, wherein said communication system is a TDMA communication system, the method further comprising assigning a single TDMA timeslot to both an advantaged one of the users and a disadvantaged one of the users.

15. A communication system for providing different effective communication energy levels to different users, said communication system comprising:

a data source providing data to be sent to classified users;

a modulation controller which determines a modulation strategy for said data based on said classified users;

an unbalanced modulator including a modulated signal output, said modulated signal output outputting an output signal modulated with said data using said modulation strategy; and a transmitter which transmits said output signal to said users during a common time period at substantially the same data rate for different modulation strategies determined by said modulation controller.

16. The communication system of claim 15, wherein said unbalanced modulator is an unbalanced phase shift keying modulator.

17. The communication system of claim 16, wherein said output signal results from modulating with said data along a minor axis of phase modulation when a first of said classified users is an advantaged user, and said output signal results from modulation with said data along a major axis of phase modulation when a second of said classified users is a disadvantaged user.

18. The communication system of claim 16, wherein said communication system is a cellular communication system, and wherein said output signal results from modulation with said data along a minor axis of phase modulation when said first user is an advantaged user geographically located relatively near a cell center, and said output signal results from modulation with said data along a major axis of phase modulation when said second user is a disadvantaged user geographically located relatively near a cell boundary.

19. The communication system of claim 15, wherein said unbalanced modulator is an unbalanced quadrature phase shift keying modulator.

20. The communication system of claim 15, wherein said communication system is a TDMA communication system, said communication system further comprising a TDMA controller which allocates both data destined for an advantaged one of the users and data destined for a disadvantaged one of the users to a single TDMA timeslot.

\* \* \* \* \*